CLOCK PULSE GENERATION AND DISTRIBUTION CIRCUIT

Filed July 2, 1962 2 Sheets-Sheet 1

INVENTOR
ARDEN J. WOLTERMAN
BY Bernard N. Wiener
ATTORNEY

CLOCK PULSE GENERATION AND DISTRIBUTION CIRCUIT

Filed July 2, 1962 2 Sheets-Sheet 2

United States Patent Office 3,171,981

Patented Mar. 2, 1965

3,171,981

CLOCK PULSE GENERATION AND DISTRIBUTION CIRCUIT

Arden J. Wolterman, Apalachin, N.Y., assignor to International Business Machines Corporation, New York, N.Y., a corporation of New York Filed July 2, 1962, Ser. No. 206,770

5 Claims. (Cl. 307—88.5)

This invention relates generally to clock pulse generation and distribution circuits, and it relates particularly to a clock pulse generation and distribution circuit for driving tunnel-diode twin-circuit logic circuitry.

A clock pulse generation and distribution circuit provides an ordered sequence of clock pulse voltage signals for timing purposes with an associated electrical circuit. Logic circuitry is used in digital computer operation to store and translate binary information. Each logic element may be established stably in one of two states. The clock pulse voltage twin-circuit signals for tunnel-diode logic circuitry appropriately drive the respective logic elements of sequential stages for translation of information therebetween at the respective clock pulse phase.

The tunnel-diode is a non-linear circuit element which may be maintained stably in one of two current-voltage conditions for a particular load line. Its current-voltage waveform is characterized by a steeply rising portion, a peak current value, a valley region and a final rising portion. The tunnel-diode is sometimes referred to as the Esaki-diode.

Tunnel-diode twin-circuit logic circuitry utilizes a pair of tunnel-diodes in a series connection as a basic logic element. The clock pulse voltages applied across the series connection condition the ultimate positive or negative voltage level to be obtained at the junction between the tunnel-diodes and thereby drives information between the logic elements of sequential stages. Tunnel-diode twin-circuit logic circuitry is sometimes referred to as Goto circuitry. Illustrative articles describing the conventional design of tunnel-diode twin-circuit logic circuitry are: "Esaki Diode High-Speed Logical Circuits," E. Goto, et al., IRE Transactions on Electronic Computers, vol. EC–9, pp. 25–29, March 1960; "Analysis and Design of the Twin-Tunnel-Diode Circuit," C. H. Alford, Jr., IRE WESCON Convention Record, part 2, pp. 94–101, 1960; and "Considerations in the Design of a Goto Logical System," W. Mead, et al., IRE Transactions on Nuclear Science, vol. NS–9, pp. 228–237, January 1962.

A clock pulse generation and distribution circuit for tunnel-diode twin-circuit logic circuitry must provide positive and negative clock pulse voltage waveforms which are mirror images of each other. A transformer having a center-tapped secondary winding may be utilized for providing such voltages. However, when a transformer secondary winding is utilized to drive a non-linear load with the characteristic of the tunnel-diode, there is a large back electromotive-force generated, and as a consequence, considerable power is required for driving the non-linear load. It is desirable that a clock pulse generation and distribution circuit having transformer input preclude the back electromotive-force developed across the secondary winding from being applied to the tunnel-diode twin-circuit logic elements limiting the power utilized. It is important that the clock pulse generation and distribution circuit provide a stable clock pulse voltage waveform during the time interval when information is being translated in the logic circuitry between sequential stages thereof. It is also important that the circuit be a low impedance during the time interval the logic elements are being driven.

It is the primary object of this invention to provide a clock pulse generation and distribution circuit for logic circuitry employing tunnel diodes.

It is another object of this invention to provide a clock pulse generation and distribution circuit which provides clock pulses with optimum voltage level stability for driving logic circuitry which utilizes the tunnel-diode twin-circuit as the basic logic element thereof.

It is a further object of this invention to provide a clock pulse generation and distribution circuit for driving tunnel-diode twin-circuit logic circuitry which utilizes transformer input with grounded center-tapped secondary winding and a pair of tunnel diode elements to isolate the logic circuitry from the back electromotive-force developed across the secondary winding during the off time of each clock pulse.

It is still another object of this invention to provide a clock pulse generation and distribution circuit for driving tunnel-diode twin-circuit logic circuitry which utilizes a transformer with a center-tapped secondary winding and a pair of tunnel-diode and capacitance circuits to preclude back electromotive-force developed in the secondary winding from affecting the operation of the logic circuitry during translation of binary information therein.

It is another object of this invention to provide a clock pulse generation and distribution circuit which minimizes the power required to drive tunnel-diode twin-circuit logic circuitry.

The foregoing and other objects, features and advantages of the invention will be apparent from the following more particular description of a preferred embodiment of the invention, as illustrated in the accompanying drawings.

In the drawings:

FIGURE 1 is a schematic diagram of a clock pulse generation and distribution circuit for driving tunnel-diode twin-circuit logic circuitry illustrating the interconnection of its components.

FIGURE 2 presents waveforms suitable for explaining the operation of the circuit of FIGURE 1, of which:

FIGURE 2, part *a*, is the current waveform applied to the primary winding of the transformer;

FIGURE 2, part *b*, is the current waveform at the secondary winding terminals;

FIGURE 2, part *c*, is the voltage waveform across the secondary winding of the input transformer; and FIGURE 2, part *d*, is the voltage waveform between an input terminal of a tunnel-diode twin-circuit and ground.

Figure 4:
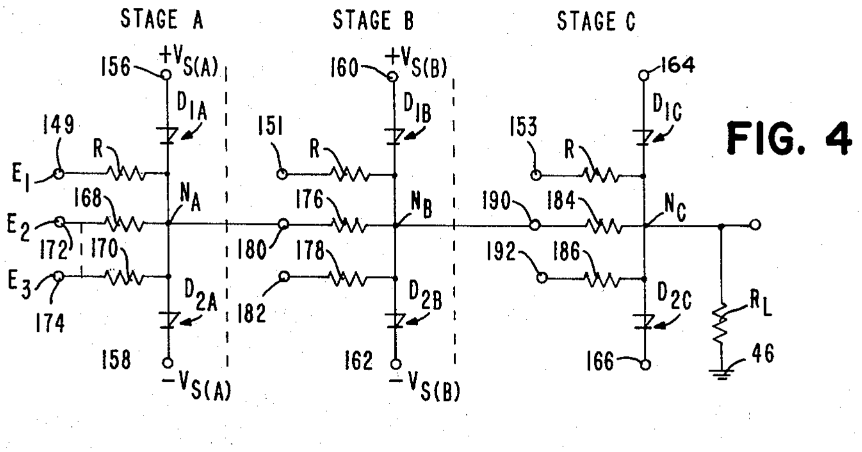
FIGURE 4 is a schematic diagram of conventional tunnel-diode twin-circuit logic circuitry suitable for application with the clock pulse generation and distribution circuit of FIGURE 1.
Figure 5:
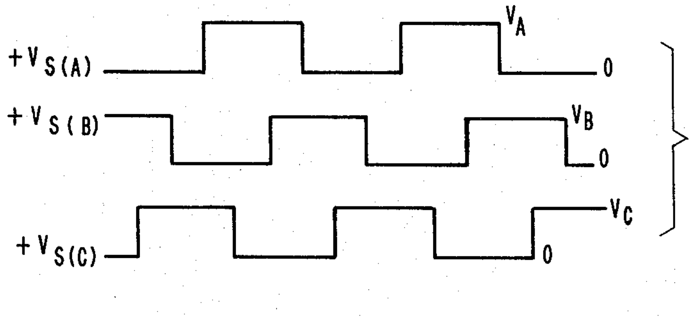

FIGURE 5 presents idealized clock pulses suitable for explaining the operation of the logic circuitry of FIGURE 4 illustrating the clock phase for the respective stage.

Figure 6:
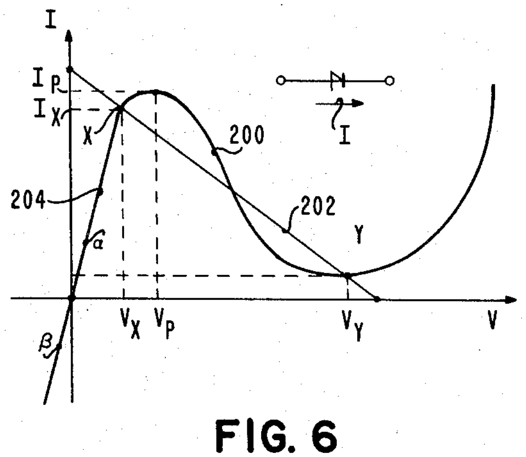

FIGURE 6 is a current-voltage waveform of a typical tunnel-diode suitable for explaining the switching characteristic of a tunnel-diode twin-circuit logic element.

Broadly this invention provides a clock pulse generation and distribution circuit for driving tunnel-diode twin-circuit logic circuitry which utilizes transformer input. A pair of symmetrical tunnel-diode circuits are used to obtain a stable low voltage level clock pulse and isolate the logic circuitry from back electromotive-force developed across the secondary winding of the transformer after the generation of each clock pulse voltage waveform. A resistance is connected in parallel with each tunnel-diode twin-circuit logic element to which the clock pulses are distributed to preclude voltage overshoot.

Particularly, this invention provides a clock pulse generation and distribution circuit for driving tunnel-diode twin-circuit logic circuitry in which the mutual inductance between the primary and secondary windings of an input transformer obtains a stable voltage level clock pulse waveform from a ramp current input. The circuit of the invention utilizes a pair of symmetrical tunnel-diode circuits connected to the transformer secondary winding to preclude the back electromotive-force developed thereacross subsequent to the generation of each clock pulse voltage waveform from being applied to the logic circuitry. Each symmetrical tunnel-diode circuit incorporates a tunnel-diode in series with the respective distribution line connected to the secondary winding, a capacitance connected between the distribution line and a grounded center-tap on the secondary winding. The respective tunnel-diode twin-circuit logic element cooperates with the electrical circuitry aforesaid to provide clock pulse voltage waveforms for conditioning each tunnel-diode twin-circuit logic element for logic information transference in the logic circuitry.

Figure 1:
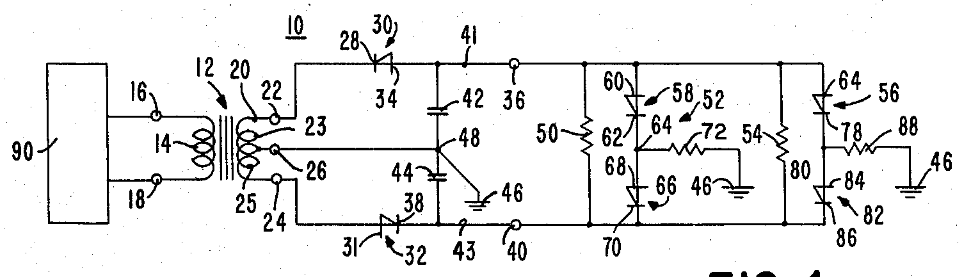

FIG. 1 presents a low voltage clock pulse generation and distribution circuit in accordance with this invention. It comprises an input transformer 12 having primary winding 14 with terminals 16 and 18; and secondary winding 20 having generation terminals 22 and 24. Secondary winding 20 has center-tap terminal 26 establishing secondary winding portions 23 and 25. Secondary terminal 22 is connected to cathode 28 of tunnel-diode 30. Terminal 24 of the secondary winding 20 is connected to anode 31 of tunnel-diode 32. Anode 34 of tunnel-diode 30 is connected to distribution terminal 36; and cathode 38 of tunnel-diode 32 is connected to distribution terminal 40. A series path of capacitances 42 and 44 is connected between distribution terminals 36 and 40. The capacitances 42 and 44 may be the distributed capacitances of the clock pulse circuit distribution lines 41 and 43. Center-tap terminal 26 of secondary winding 20 is connected to ground 46 which is also connected to the junction 48 between capacitors 42 and 44. Resistance 50 and tunnel-diode twin-circuit logic element 52 are connected in parallel between distribution terminals 36 and 40; and resistance 54 and tunnel-diode twin-circuit logic element 56 are connected in parallel between distribution terminals 36 and 40.

Tunnel-diode twin-circuit logic element 52 comprises the series path of: tunnel-diode 58 with its anode 60 connected to terminal 36 and its cathode 62 connected to junction 64; and tunnel-diode 66 with its anode 68 connected to junction 64 and its cathode 70 connected to distribution circuit terminal 40. Junction 64 between tunnel-diodes 58 and 66 is connected via load resistance 72 to ground 46. Tunnel-diode twin-circuit logic element 56 comprises the series path of: tunnel-diode 64 with its anode 76 connected to terminal 36 and its cathode 78 connected to junction 80; and tunnel-diode 82 with its anode 84 connected to junction 80 and its cathode 86 connected to distribution circuit terminal 40. Junction 80 between tunnel-diodes 56 and 82 is connected via load resistance 88 to ground 46.

Figure 2:
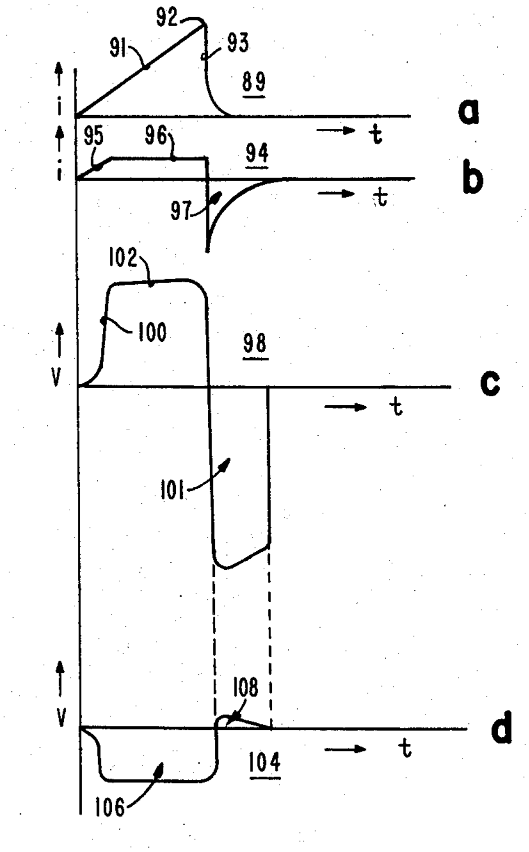

FIG. 2(*a*) illustrates a ramp current 89 which is applied to primary winding 14 input terminals 16 and 18. It is generated by a conventional ramp current source 90. A reference which illustrates a current-ramp generator suitable for providing a ramp current is the text: "Recurrent Electrical Transients" by L. W. von Tersch, et al.; Prentice Hall, Inc., 1953. Ramp current 89 comprises ramp portion 91, peak current 92 and descending portion 93.

FIG. 2(*b*) is the waveform 94 of the transformer 12 secondary winding 20 current. It comprises initial rising portion 95, horizontal portion 96, and negative portion 97.

FIG. 2(*c*) is the waveform of the voltage 98 developed across the secondary winding generation terminals 22 and 24. It comprises positive voltage portion 100 and negative portion 101. Forward positive portion 100 has an essentially constant peak value 102.

FIG. 2(*d*) is the voltage waveform of the clock pulse voltage 104 between distribution terminal 40 and ground 46. It comprises negative portion 106 and positive portion 108.

Figure 3:
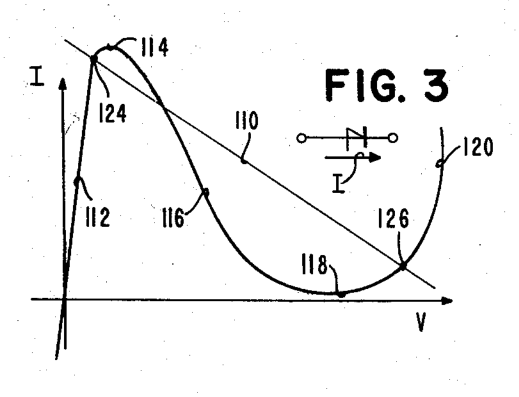
FIGURE 3 is the current waveform of a tunnel-diode utilized in FIGURE 1 to prevent the back electromotive-force developed across the secondary of the transformer from being applied to the tunnel-diode twin-logic circuitry.

FIG. 3 illustrates the current voltage characteristic of symmetrical tunnel-diode 30 and of symmetrical tunnel-diode 32 with an associated load line 110. It includes steeply rising portion 112, peak current 114, descending portion 116, valley region 118 and rising portion 120. Load line 110 establishes stable operating points 124 and 126.

The nature and operation of an illustrative logic circuit utilizing the tunnel-diode twin-circuit as the basic logic element thereof will be described with reference to FIGS. 4 to 6.

FIG. 4 presents a three-stage resistance-coupled majority logic circuit comprising stages A, B and C. An illustrative majority-logic signal steering voltage $E_1$ is applied to terminal 149 and thence to the respective nodes $N_A$, $N_B$ and $N_C$ via resistor R of the respective tunnel-diode twin-circuit logic element for the different stages A, B and C. Tunnel-diode twin-circuit logic element for stage A comprises tunnel-diodes $D_{1A}$ and $D_{2A}$ connected in series between terminals 156 and 158; tunnel-diode twin-circuit logic element for stage B comprises tunnel-diodes $D_{1B}$ and $D_{2B}$ connected in series between terminals 160 and 162; and tunnel-diode twin-circuit logic element for stage S comprises tunnel-diodes $D_{1C}$ and $D_{2C}$ connected in series between terminals 164 and 166. Input resistances 168 and 170 are connected between respective majority-logic signal terminals 172 and 174 and node $N_A$; resistances 176 and 178 are connected between respective majority-logic signal terminals 180 and 182 and node $N_B$. The resistances 184 and 186 are connected between respective majority-logic signal terminals 190 and 192 and node $N_C$. Load resistor $R_L$ is connected between node $N_C$ and ground 46. It is indicative of the reflected load of subsequent stages, not shown.

With reference to FIG. 5, idealized clock pulse voltage source waveforms $+V_{S(A)}$, $+V_{S(B)}$, and $+V_{S(C)}$ are connected to terminals 156, 160 and 164, respectively. The mirror images $-V_{S(A)}$, $-V_{S(B)}$ and $-V_{S(C)}$ of these clock pulse voltage waveforms are connected respectively to terminals 158, 162 and 166. The voltage waveforms of FIG. 5 together with the mirror images thereof comprise the three-phase clock pulse system for driving the tunnel-diode twin-circuit logic circuitry of FIG. 4. The time sequence of the clock pulses applied to sequential stages is overlapping to assure the translation of logic information in the logic circuitry.

FIG. 6 presents an illustrative tunnel-diode current-voltage characteristic curve 200 for a tunnel-diode of FIG. 4, e.g. $D_{1A}$ or $D_{2A}$. The two intersections of load line 202 with the voltage-current waveform 200 establish stable operating points X and Y for the tunnel-diode. After the respective pair of positive and negative clock pulses have been applied to the tunnel-diode twin-circuit logic element of a particular stage, one diode in the logic element assumes the state X and the other assumes the state Y in accordance with the direction of the steering input currents to the node of the stage. The magnitude of the clock pulse voltage waveform which is required to drive the respective logic element appropriately is given by the expression:

$$V_S = \frac{V_X + V_Y}{2}$$

For the following explanation of the operation of the logic circuitry of FIG. 4, assume as the initial conditions that the clock pulse voltage waveforms $V_{S(A)}$ and $-V_{S(A)}$ are at ground potential 46; that the input majority-logic signal steering voltage $E_1$ applied to majority-logic terminal 149 of stage A is a positive voltage; and that terminals 172 and 174 are at ground potential. Under these conditions, the voltage $V_{N(A)}$ of the node $N_A$ is positive. The current I through the resistance R is equal to the expression $(E_1-V_{N(A)})/R$. Therefore, tunnel-diode $D_{2A}$ is forward biased and tunnel-diode $D_{1A}$ is reverse biased. Since the forward and reverse resistances of the tunnel-diode near the origin of the I and V axes are equal, the steering current which flows in each tunnel-diode of the logic element of stage A has the same magnitude. The operating points for tunnel-diodes $D_{1A}$ and $D_{2A}$ are designated alpha ($\alpha$) and beta ($\beta$) respectively for the noted steering current. As the magnitudes of the clock pulse voltage waveforms $V_{S(A)}$ and $-V_{S(A)}$ increase, both of the operating points $\alpha$ and $\beta$ move along the ascending portion 204 of the current-voltage waveform 200 toward the peak value $I_P$. The tunnel-diode $D_{2A}$ reaches its peak current $I_P$ first because of the initial steering current which flows into the node $N_A$ as a result of the positive voltage E being applied to terminal 149. As a consequence of the simultaneity of the clock pulse $+V_{S(A)}$ and $-V_{S(A)}$ the steering voltage $E_1$ and the negative resistance property of the current-voltage waveform 200, a regenerative switching action occurs in the logic element. During the regenerative switching action, tunnel-diode $D_{2A}$ switches to its high-voltage low-current state Y, and tunnel-diode $D_{1A}$ switches to its low-voltage high-current state X. Under this circumstance the node voltage $V_{N(A)}$ is given by the expression $V_{S(A)}-V_X$.

As has been indicated above, the state of each tunnel-diode in each twin-circuit logic element is determined by the current inputs to the node thereof when the respective clock pulses are applied to its terminals. The resistance R of each majority-logic input is made large relative to the combined tunnel-diode impedances of a logic element, and with steering voltage applied thereto represents a current source for the respective node. The algebraic sum of the majority-logic input currents to the node of the respective stage determines the node voltage when the clock pulses are being applied to the logic element. The node assumes the same voltage polarity as the majority of the input voltages $E_1$, $E_2$ and $E_3$. The logic element is often referred to as a majority-logic element because of this feature. Information is translated from stage to stage of the logic circuit by the over-lapping clock pulses of FIG. 2. The phasing of the clock pulses is such that the input to stage B from the stage A is present when the clock pulse voltages are applied to stage B; and the input to stage C from stage B is present at the time when the clock pulses are applied to stage C.

The operation of the clock pulse generation and distribution circuit provided by this invention will be explained with reference to the embodiment 10 thereof illustrated in FIG. 1. The ramp current of FIG. (*a*) is applied to transformer 12 via terminals 16 and 18 of its primary winding 14 from ramp current source 90. The transformer 12 is utilized to generate both positive and negative clock pulse voltage waveforms for driving the tunnel-diode twin-circuit logic elements 52 and 56. Either logic element 52 or logic element 56 may be the particular logic element of stage A, B or C of FIG. 4, with the other logic element being located within the logic circuitry and driven at the same clock pulse rate.

The voltage $v_2$ developed across the secondary winding 20 of the transformer 12 is given by the expression $$v_2=M\frac{di_1}{dt}-L_2\frac{di_2}{dt}$$

where $i_1$ and $i_2$ are the primary winding 14 and secondary winding 20 currents respectively; M is the mutual inductance of the primary winding 14 and secondary winding 20; and $L_2$ is the self inductance of the secondary winding 20.

When the initial ramp portion 95 of the secondary winding current increases to the peak current value $I_P$ of either diode 58 or 66 of the logic element 52, and of either tunnel-diode 64 or 82 of the logic element 56, the secondary voltage $v_2$ increases on rising portion 100. When the peak current value $I_P$ of the respective tunnel-diode in the logic elements 52 and 56 is reached, the tunnel-diode switches to its high voltage state and the respective logic element becomes a high impedance. The resistances 50 and 72 are selected for logic element 52 and the resistances 54 and 88 are appropriately selected for logic element 56 in order that the secondary current $i_2$ after switching of one of the tunnel-diodes has the magnitude of the constant portion 96.

Since the change in secondary winding current, $$\frac{di_2}{dt}$$

is essentially equal to zero after the switching of the tunnel-diodes, the secondary voltage $v_2$ is dependent mainly on the mutual inductance M between the primary and secondary windings 14 and 20 and the time rate of change $di_1/dt$ of the primary winding current. Since both M and $di_1/dt$ are constant, the secondary voltage $v_2$ for the time duration of secondary current $i_2$ being equal to the constant portion 96 is the constant voltage 102. During the time that the secondary voltage $v_2$ has the horizontal portion 102, the tunnel-diodes 30 and 32 are in their reverse voltage and current conditions. In this condition, they present low impedances to the transformer 12. Therefore, the magnitude of the clock pulse voltage applied to the logic elements 52 and 56 is essentially independent of the current-voltage state of the particular tunnel-diodes. The primary current $i_1$ has a peak value comparable to, but greater than, the peak current values of the tunnel-diodes 30 and 32. When this peak current value is reached, the ramp current 89 is abruptly terminated and is reduced to zero along the path portion 93. This causes a reversal of the secondary current $i_2$, shown as the portion 97. As a result, both tunnel-diodes 30 and 32 are switched to their high voltage states. Tunnel-diodes 30 and 32, after they have switched to their high voltage state present high impedances to the secondary winding 20 of the transformer 12. The clock pulse voltage 104 is brought essentially to zero value along the waveform portion 108. Therefore, the back electromotive-force portion 101 of the secondary voltage 98 does not appear across the logic elements 52 and 56. Tunnel-diodes 30 and 32 have relatively high peak current 114 and very low resistance in the reverse current and voltage directions compared to these parameters for the tunnel-diodes of the logic elements, i.e. tunnel-diode 58.

The manner by which the capacitances 42 and 44 assure the switching of the symmetrical tunnel-diodes will be explained by assuming that tunnel-diode 30 switches to its high voltage state first. The voltage across capacitance 42 does not change instantaneously. When tunnel-diode 30 switches to its high voltage state, the voltage change thereacross is coupled by the mutual inductance between secondary winding portions 23 and 25 to tunnel-diode 32. This increased voltage aids in switching tunnel-diode 32. This cooperation between the tunnel-diode circuits assures rapid reversal of states of the tunnel-diodes 30 and 32 even though their peak current values may not be matched closely.

While the invention has been particularly shown and described with reference to a preferred embodiment thereof, it will be understood by those skilled in the art that various changes in form and details may be made therein without departing from the spirit and scope of the invention.

What is claimed is:

1. A clock pulse generation and distribution circuit for logic circuitry comprising, in combination:

a tunnel-diode twin-circuit logic element in said logic circuitry having first and second tunnel-diodes;

an input transformer having primary and center-tapped secondary windings, the respective ends of said secondary winding defining first and second pulse generation terminals;

a ramp current source, said ramp current source being adapted to apply a ramp current to said primary winding;

first and second pulse distribution terminals, said tunnel-diode twin-circuit logic element being connected in the forward current direction thereof between said pulse distribution terminals;

first and second pulse distribution lines connected respectively between said first and second pulse generation and pulse distribution terminals;

third and fourth tunnel-diodes having relatively high peak current and low resistance characteristics in the reverse current and voltage directions compared to these parameters for said logic element, said third and fourth tunnel-diodes being connected respectively in series in said first and second distribution lines, said third and fourth tunnel-diodes being poled with respect to their forward current direction oppositely to the forward current direction of said tunnel-diode twin-circuit logic elements; and first and second capacitances connected respectively between said first and second distribution lines and ground potential, said connections to said distribution lines being between said third and fourth tunnel-diodes and said tunnel-diode twin-circuit logic element; said third and fourth tunnel-diodes having approximately equal peak currents; whereby the back electromotive-force developed across said secondary winding is precluded from said logic element.

2. The clock pulse generation and distribution circuit of claim 1 in which said first and second capacitances are the distributed capacitances of said first and second distribution lines, respectively.

3. A clock pulse generation and distribution circuit for logic circuitry comprising, in combination:

a tunnel-diode twin-circuit logic element in said logic circuitry;

a resistance connected in parallel with said logic element;

an input transformer having primary and center-tapped secondary windings, the respective ends of said secondary winding defining first and second pulse generation terminals;

a ramp current source, said ramp current source being adapted to apply a ramp current to said primary winding;

first and second pulse distribution terminals, said tunnel-diode twin-circuit logic element being connected in the forward current direction thereof between said pulse distribution terminals;

first and second pulse distribution lines connected respectively between said first and second pulse generation and pulse distribution terminals;

third and fourth tunnel-diodes having relatively high peak current and low resistance characteristics in the reverse current and voltage directions compared to these parameters for said logic element, said third and fourth tunnel-diodes being connected in series in said first and second distribution lines, said third and fourth tunnel-diodes being poled with respect to their forward current direction oppositely to the forward current direction of said tunnel-diode twin-circuit logic element; and first and second capacitances connected respectively between said first and second distribution lines and ground potential, said connections to said distribution lines being between said third and fourth tunnel-diodes and said tunnel-diode twin-circuit logic element; said third and fourth tunnel-diodes having approximately equal peak currents; whereby the back electromotive-force developed across said secondary winding is precluded from said logic element and said resistance aids in precluding clock pulse overshoot.

4. The clock pulse generation and distribution circuit of claim 3 in which said first and second capacitances are the distributed capacitances of said first and second distribution lines, respectively.

5. A voltage pulse generation and distribution circuit comprising, in combination:

an input transformer having a primary winding and a secondary winding with respective terminals therefor, said secondary winding having a center-tap terminal;

first and second tunnel-diodes, said first tunnel-diode having its cathode connected to one terminal of said secondary winding, said second tunnel-diode having its anode connected to the other said terminal of said secondary winding;

first and second capacitances serially connected, having respective terminals and a common junction, said first capacitance terminal being connected to the anode of said first tunnel-diode and said second capacitance terminal being connected to the cathode of said second tunnel-diode, said common junction of said capacitances being connected to said center-tap terminal of said secondary winding and being further connected to ground potential;

third and fourth tunnel-diodes connected in a tunnel-diode twin circuit having respective terminals and a common junction, said third and fourth tunnel-diodes having relatively high peak current and low resistance characteristics in the reverse current and voltage directions with respect to these parameters for said first and second tunnel-diodes;

a resistance, said tunnel-diode twin-circuit and said resistance being connected in a parallel circuit in a closely electrically proximate circuit, said one terminal of said tunnel-diode twin-circuit being connected to said anode of said first tunnel-diode and said second terminal of said tunnel-diode twin-circuit being connected to said cathode of said second tunnel-diode;

resistive load means connected between said tunnel-diode twin-circuit common junction and said ground potential; and means to apply to said terminals of said transformer primary winding a ramp current having pre-established ramp slope and termination time; whereby voltage pulses are applied to said tunnel-diode twin-circuit, thereby to cause a change of current in said resistive load means, and whereby the interaction of said first and second tunnel-diodes and said first and second capacitances and said secondary winding precludes the back electromotive-force developed in said transformer secondary winding from reaching said terminals of said tunnel-diode twin-circuit.

References Cited in the file of this patent

UNITED STATES PATENTS

| | | |
|---|---|---|
| 2,788,442 | Smith | Apr. 9, 1957 |
| 3,047,813 | Danker | July 31, 1962 |
| 3,061,743 | Fukui et al. | Oct. 30, 1962 |

OTHER REFERENCES

Univ. of Ill. Grad. Coll. Dig. Comp. Lab., Report #102, "Application of Tunnel Diodes in Switch Circuits," by Kunihir, pages 23 and 24, 54 and 55, Oct. 26, 1960.

"Electronics," June 24, 1960, Tunnel Diode Logic Circuits, by Chow, pages 103–107.